(12) United States Patent
Loney et al.

(10) Patent No.: US 8,902,372 B2
(45) Date of Patent: Dec. 2, 2014

(54) MODULAR PICO PROJECTION WALL

(75) Inventors: Robert Loney, Fairfield, CA (US);
Matthew Ward, Philadelphia, PA (US)

(73) Assignee: Superlumenary, Philadelphia, PA (US)

( * ) Notice: Subject to any disclaimer, the term of this patent is extended or adjusted under 35 U.S.C. 154(b) by 312 days.

(21) Appl. No.: 12/728,699

(22) Filed: Mar. 22, 2010

(65) Prior Publication Data

US 2010/0238337 A1  Sep. 23, 2010

Related U.S. Application Data

(60) Provisional application No. 61/210,533, filed on Mar. 20, 2009.

(51) Int. Cl.
*H04N 5/64* (2006.01)
*H04N 9/31* (2006.01)

(52) U.S. Cl.
CPC ........... *H04N 9/3185* (2013.01); *H04N 9/3194* (2013.01); *H04N 9/3129* (2013.01)
USPC .............. 348/744; 353/29; 359/449; 348/191

(58) Field of Classification Search
USPC .............. 348/744–747; 353/29–31; 250/353, 250/235; 359/449
See application file for complete search history.

(56) References Cited

U.S. PATENT DOCUMENTS

| | | | |
|---|---|---|---|
| 7,364,309 B2 * | 4/2008 | Sugawara et al. ............... 353/85 |
| 7,393,107 B2 * | 7/2008 | Yonekubo et al. .............. 353/29 |
| 7,410,263 B2 * | 8/2008 | Miyazawa et al. .............. 353/94 |
| 7,878,657 B2 * | 2/2011 | Hajjar .............................. 353/29 |
| 2007/0252086 A1 * | 11/2007 | Chou et al. ..................... 250/353 |
| 2009/0090782 A1 * | 4/2009 | May .......................... 235/462.21 |

* cited by examiner

*Primary Examiner* — Michael Lee
(74) *Attorney, Agent, or Firm* — Schott, P.C.

(57) ABSTRACT

A display system includes a laser projector that projects light onto a the back of a screen, a sensor that detects light reflected from the back of the screen, a processor in communication with the sensor, the processor controlling light projected from the laser projector based on data regarding the light detected from the sensor. The laser projector, sensor, and processor are all contained within a single housing.

21 Claims, 5 Drawing Sheets

31

MODULAR PICO PROJECTION WALL

CROSS REFERENCE TO RELATED APPLICATION(S)

This application claims the benefit of U.S. Provisional Application No. 61/210,533 filed Mar. 20, 2009, which is incorporated by reference as if fully set forth.

FIELD OF INVENTION

The field of the invention relates to videowalls and modular display systems that make use of a projector contained within a housing.

BACKGROUND

Videowall and modular display systems are currently used in control room and entertainment applications. Videowall systems with open frames using CRT projectors are manufactured by Philips. Videowall systems composed of solid frames are manufactured by Electrosonic, Toshiba, Gunderman, Pioneer, and Mitsubishi. These products traditionally use straight and folded optical systems, the difference between the two being the need for a mirror and the increased importance of rigidity in the design of the videowall module.

Projections cubes may use CRT, LCD, or DLP imaging systems. These systems have an innate video format that depends on the imager. Most imagers have had a 4:3 ratio and so the construction of the frame often provides for this format. More recently 16:9 ratio imagers have been used in videowall systems.

In this disclosure, the words "cube" and "projection cube" refer to the box like shape of standard modular projection displays. These terms are considered generic and could be used to describe a module from any system where a display is contained in a stackable housing.

In the videowall or projection cube setting, the fixed format of the imager has a direct impact on the lamp requirements in the LCD and DLP based systems. In most cases, both light and processing power are wasted because the entire imager is not used.

SUMMARY

A display system includes a laser projector that projects light onto a the back of a screen, a sensor that detects light reflected from the back of the screen, a processor in communication with the sensor, the processor controlling light projected from the laser projector based on data regarding the light detected from the sensor. The laser projector, sensor, and processor are all contained within a single housing.

DETAILED DESCRIPTION OF THE PREFERRED EMBODIMENTS

The embodiments described herein may comprise a scanning laser-based video projection modular display system that includes a color or multicolor scanning laser video projector, a diffusion screen surface with a reflective pattern defining the outside edges of the screen, a sensor to detect reflections and ensure that the correct data is displayed on the screen while also calibrating the white point and color spectrum of the laser. The embodiments may also include a processor to map the incoming video data onto the screen. The laser projector may additionally be used to communicate with other panels during configuration and trouble-shooting.

Figure 1:
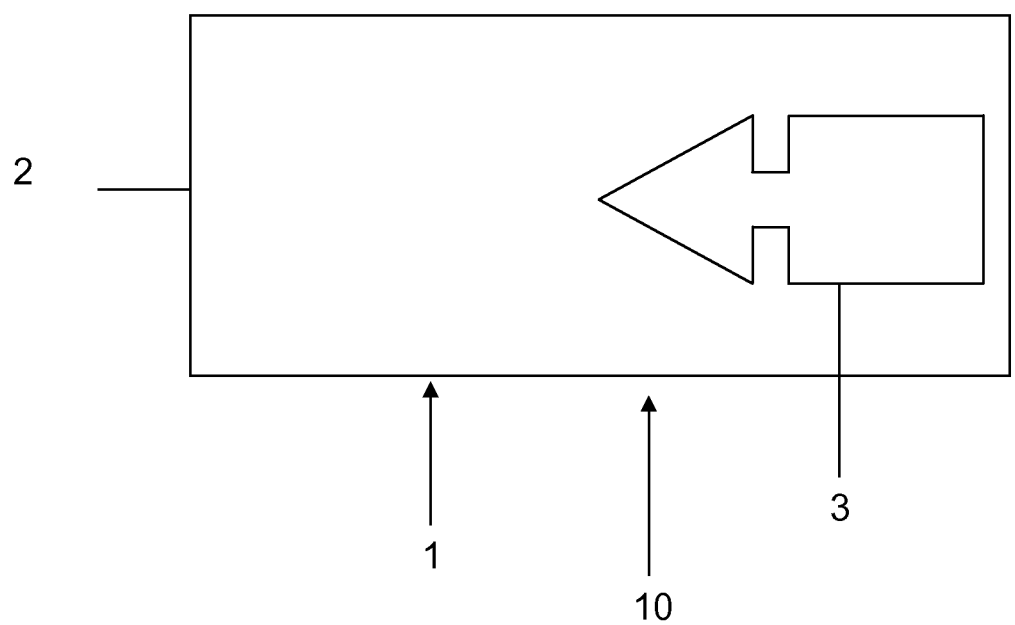
FIG. 1 is an illustration of a parts of a typical projection cube.
Figure 2:
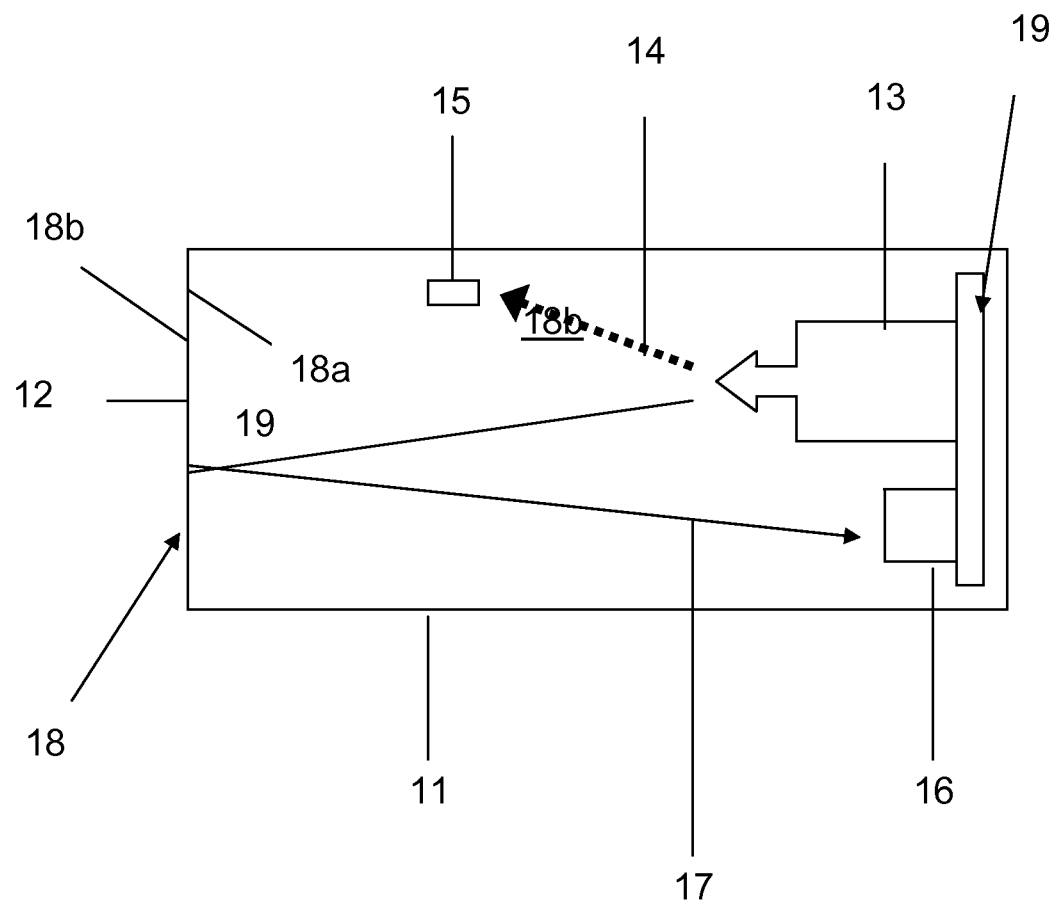
FIG. 2 is an illustration of an embodiment of the present disclosure.

FIG. 1 shows a projection cube 10 herein is a frame 1 that incorporates a screen 2 and a projector 3. The frame 1 can be open or closed. Expanding on the general cube, FIG. 2 shows a cube 10 that includes all or some of the following: a housing or frame 11 containing a screen 12 and a projector 13. The projector 13 is a scanning projector such as a Microvision Pico projector or a Light Blue Optics Pico projector. The projector 13 is programmed to scan across a luminance and chrominance meter 15 in order to maintain calibration. And a sensor such as a CMOS or CCD 16 can be used to detect reflections 17 off the back 18a of the screen 18, which is visible to a viewer by looking at the screen 18's front 18b. A sensor controls the location of video imagery would most likely include a small CCD or CMOS device in addition to a dedicated sensor to adjust white balance (such as the Avago APDS 9008).

Figure 5:
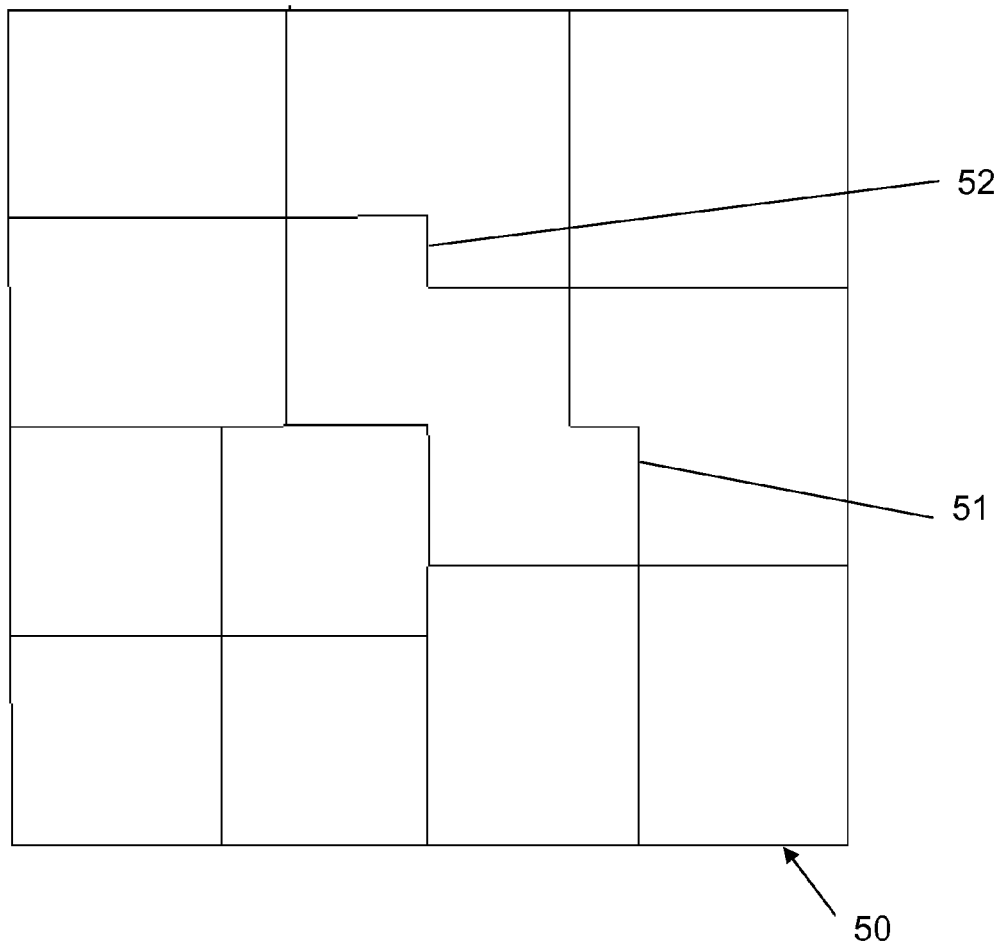
FIG. 5 shows a pattern printed on the back of a screen for projector alignment.

As shown in FIG. 5, a reflective pattern 50 can be printed on the back of the screen 18 can also be used to align the laser projector's scanning head and the active projection area. The pattern 50 can be printed or embossed or otherwise incorporated into the screen material in such a way that light generated by the laser projector 13 can be used by the sensor 16 to generate data that the processor 22 can use to determine the absolute position of the scanning laser on the screen 12. The pattern 50 may include reference points for different screen resolutions. In this illustration the lines on the right 51 are ⅓ marks and the lines on the left 52 are ¼ screen marks.

A GPU or other processor can be included on the main board within each cube 10.

Figure 3:
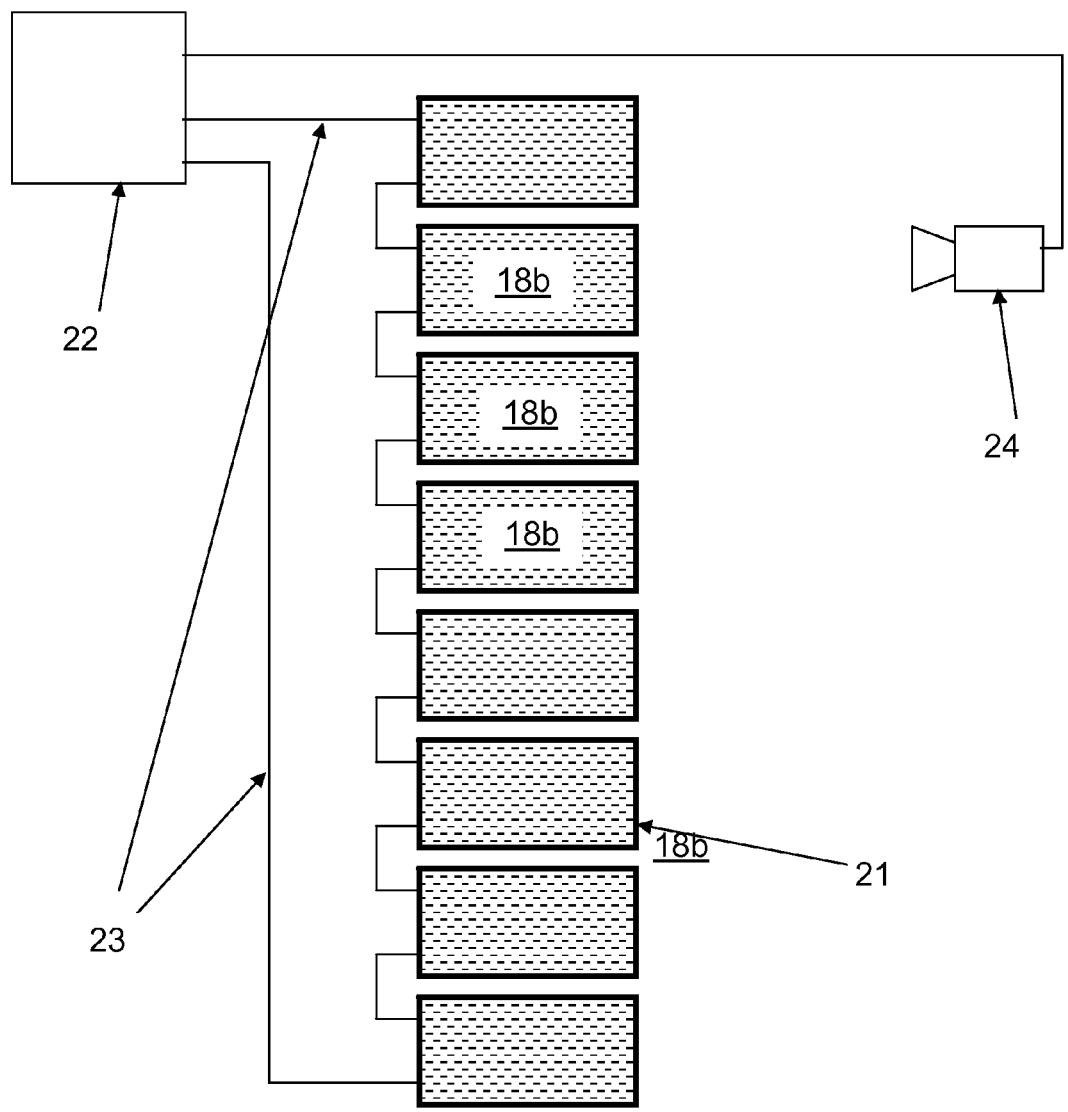
FIG. 3 is an illustration of a system comprising projection modules.

FIG. 3 shows a system comprising multiple projection cubes 21 that include a primary processor or processors 22 connected to the projection cubes 21 wirelessly or by wires 23. Such a system could include a camera 24 to automate configuration and alignment.

Data communication between the sensor 24 and processor 22 and cubes 21 can be based on DisplayPort or any other standard that incorporates video and data information in a single stream. Such a system would allow the controller and any external inputs such as cameras to communicate with the internal GPU in order to remap the video and tune the scanning laser system.

In the multi-cube, multi-display arrangement of FIG. 3, the projector (inside each cube) directs the light source onto X, Y (and even Z) coordinates on a screen (labeled 18 in FIG. 2) in accordance with an incoming portion of a video signal from the processor 22. A control unit (not shown) maps the incoming video signal onto the screen based on data from the sensor 24.

What is described in the embodiments shown in FIGS. 1-3, is a closed loop feedback system wherein the sensor 16,24 feeds optical measurements made from detecting the light projected onto the back of the screen 18 into the processor 19. The processor, which is shown as separate from the projector 13 but may be part of it, employs a mapping software to then map what it is projecting onto the screen 18 based on the feedback from the sensor 16. The display mapping can be adjusted by a user to achieve different effects including contrast enhancement, high speed playback, lower power consumption, polarized playback for 3D applications, and bandwidth management.

Figure 4:
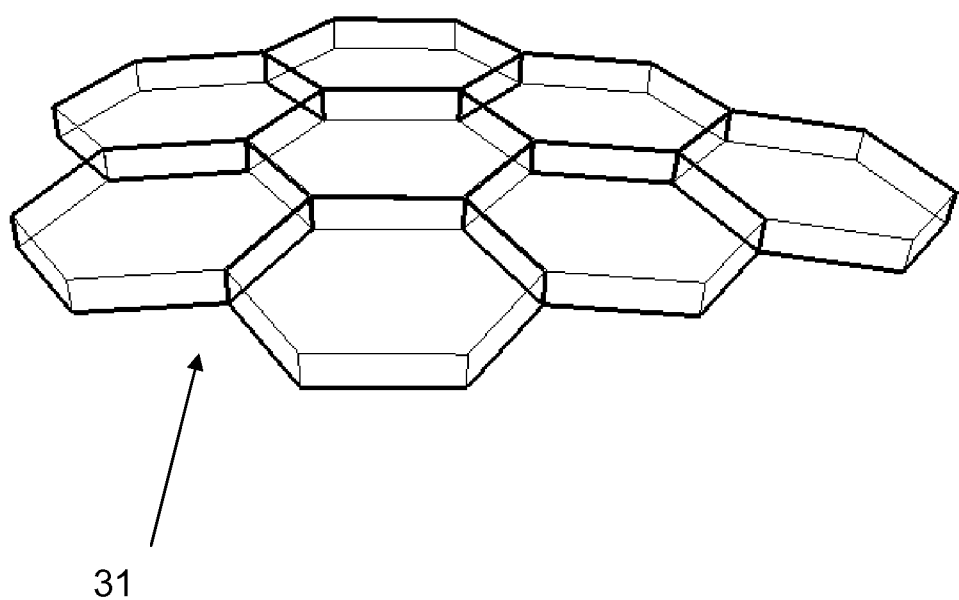
FIG. 4 is an array of hexagons according to an embodiment.

Hexagonal modules 31 are one embodiment of the present disclosure, as shown in FIG. 4, and could be used in place of the cubes 21. The projection system may use a unique mechanical orientation between the pico projection cubes/hexagons relative to one another in the form of tessellations. This greatly differs from previous video wall systems that create video imagery in a single 2-dimensional plane. By the use of mechanical attachment or hinge points between the various pico cube tessellations, the formation of uniquely articulated 3-dimensional shapes becomes possible.

An enhancement of the Modular Pico Projection Wall could be to include pico laser projectors singularly or in pairs for each projection module to create stereoscopic 3D images. The light from each projector, or pair of projectors, could be polarized using linear or circular polarization. The stereoscopic system employed could use either a time sequential (active) or a time parallel (passive) stereoscopic technique. The result could be viewed with passive or active (synchronized) 3D glasses.

One of the advantages of the scanning laser projector is that all of the photonic energy generated by the laser lands on the active areas of the screen and no energy-wasting over-scanning required. Furthermore, custom shapes can be created with relative ease since the closed loop feedback system allows the laser to illuminate just the active projection areas. It is therefore possible to create a square, a triangle, an oval, a hexagon or just about any other shape without wasting large amounts of light and energy required in traditional displays.

The laser projector used herein may vary the pixel pitch of the screen. The pixel pitch of traditional display systems employing LED, plasma, LCD, LCOS, and DLP technology subsystems, is fixed by the imaging device. The laser projector may also use part of an imager and duplicate content across pixels to reduce the resolution (which might be desirable in a modular display where the display resolution can exceed the source resolution in even small displays).

In a laser projection wall using a scanning laser it would be possible to vary the pixel pitch of the screen either as a whole or fractionally using configuration software to setup the wall and using a video server to deliver the appropriate content to the right section of the screen. This means a small section of the screen could have a 1 mm pixel pitch but the larger area of the screen could have a 4 mm pixel pitch. This also means that the screen could be configured to accurately reflect the native resolution of the source material no matter how large the display. This accurate pixel for pixel display of the content usually leads to the highest quality image.

The ability to vary the pixel pitch and to configure the screen for different applications increases the flexibility of the product and takes full advantage of the convergence of data and video networks. Such a system could run off Display Port or Ethernet or a Fiber-Channel Over Ethernet backbone. The low power requirements of the lasers will also allow the combination of the data and power connections further reducing parts.

Another proposed enhancement in this video projection modular display system could involve an infrared sensor that could sense whether a viewer's body was in front of the screen. The sensor could relate this information to the processor/GPU which could then pull higher resolution data off the data bus for the effective local image area. The image displayed could then be higher resolution to serve that viewer; the closer the viewer, the sharper the image, the farther the viewer moves from the screen, the less bandwidth/video data is allocated to that part of the screen. This could allow for the most effective use of limited video data bandwidth resources.

The ability to vary the duty cycle of the laser is also an advantage. The sensors in the unit could adjust screen brightness to suit the ambient light levels.

A user may also be able to choose between higher pixel fill levels (lower point brightness) and lower pixel fill levels (higher point brightness). This may be advantageous in a display that could be used in different viewing environments. The higher point brightness may allow a user to present a higher contrast display under the right conditions. A lower point brightness with higher fill level may be more desirable in a near field viewing environment.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A display system comprising:
    a laser projector that projects light comprising a color image to be viewed onto a back side of a screen;
    a reflective pattern printed on the back side of the screen;
    a sensor that detects light reflected from the reflective pattern on the back side of the screen;
    a processor in communication with the sensor, the processor controlling light projected from the laser projector based on data regarding the light detected from the sensor;
    wherein the laser projector, sensor, and processor are all contained within a single housing, wherein the laser projector and the reflective pattern are located on a same side of the screen;
    wherein higher resolution data is displayed based on user proximity to the screen, wherein based on user proximity to the screen, the resolution and illumination change so that the projected light is less dense while the light output increases.

2. The display system of claim 1, wherein the housing is a cube.

3. The display system of claim 1, wherein the housing is hexagonal.

4. The display system of claim 1, wherein the screen has a front side that is visible to a viewer outside the housing.

5. The display system of claim 1, wherein the processor controls light projected from the projector using a mapping software.

6. The display system of claim 5, wherein the mapping software locates the projected light on the screen using a coordinate system.

7. A multi-screen multi-projector display comprising at least two individual display systems, each comprising a laser projector that projects light comprising a color image to be viewed onto a the back side of a screen, the multi-screen display comprising:
    a reflective pattern printed on the back side of the screens;
    a sensor that detects light reflected from the reflective pattern on the back side of the screens;
    a processor in communication with the sensor, the processor controlling light projected from each laser projector based on data regarding the light detected from the sensor, wherein the laser projector and the reflective pattern are located on a same side of the screen;

wherein higher resolution data is displayed based on user proximity to the screens, wherein based on user proximity to the screens, the resolution and illumination change so that the projected light is less dense while the light output increases.

8. The display of claim 7, wherein the processor controls light projected from each projector using a mapping software.

9. The display system of claim 8, wherein the mapping software locates the projected light on the screens using a coordinate system.

10. The display system of claim 1, wherein the reflective pattern includes reference points for different screen resolutions.

11. The display system of claim 8, wherein the reflective pattern includes reference points for different screen resolutions.

12. The display system of claim 9, wherein the reflective pattern includes reference points for different screen resolutions.

13. The display system of claim 1, wherein the reflective pattern is used to determine the position of the projected light on the screen.

14. The display system of claim 1, wherein the sensor adjusts screen brightness in response to ambient conditions.

15. The display system of claim 14, wherein the brightness is adjusted by changing the duty cycle of the laser projector.

16. The display system of claim 14, wherein the brightness is adjusted by changing pixel fill levels.

17. The display system of claim 1, wherein the reflective pattern comprises reference points corresponding to different screen resolutions.

18. The display system of claim 1, wherein the processor controls light projected from the projector to conserve energy by transmitting less light.

19. The display system of claim 7, wherein the reflective pattern is used to determine the position of the projected light on the screen.

20. The display system of claim 7, wherein the screens are connected to each other.

21. The display system of claim 20, wherein the connection between each screen is a hinged connection.

* * * * *